SEMICONDUCTOR DEVICE AND METHOD OF ITS MANUFACTURE

Filed March 9, 1953

Inventor:

Otfried Madelung

United States Patent Office 2,754,456

Patented July 10, 1956

2,754,456

SEMICONDUCTOR DEVICE AND METHOD OF ITS MANUFACTURE

Otfried Madelung, Erlangen, Germany, assignor to Siemens-Schuckertwerke Aktiengesellschaft, Berlin-Siemensstadt, Germany, a corporation of Germany Application March 9, 1953, Serial No. 341,255

Claims priority, application Germany March 11, 1952

5 Claims. (Cl. 317—237)

My invention is related to that of the copending application of H. Welker, Serial No. 275,785, filed March 10, 1952 and assigned to the assignee of the present invention.

The invention concerns semiconductors for electric resistance devices, rectifiers, amplifiers, detectors, control apparatus, photo-cells and other technological purposes, and has for its general object to provide a semiconductor device that can be made more cheaply than those heretofore available while nevertheless offering a satisfactory longevity and stability of semiconductor operation.

To achieve this object, and in accordance with my invention, I provide such devices with a semiconductor body which consists essentially of a binary compound of aluminum with an element of the second subgroup in the fifth group of the periodic system of elements, and which has a coating of aluminum oxide on the surface areas not contacted by the pertaining electrodes.

Figure 1:
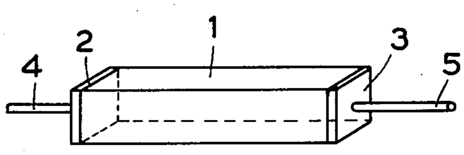
Figure 2:
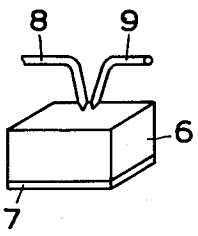
Figure 3:
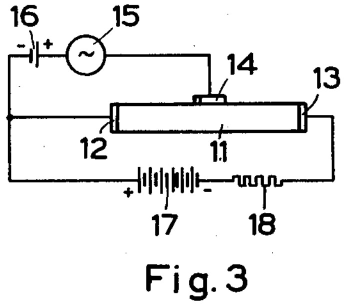
Figure 4:
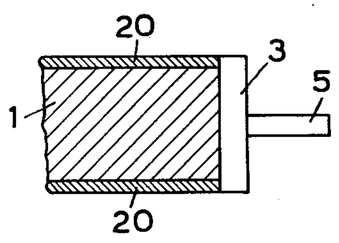

The above-mentioned object and the means for achieving it according to my invention will be understood from the following, with reference to the accompanying drawings showing in Fig. 1 a perspective view of a resistance device, in Fig. 2 a three-electrode device for detector or amplifier purposes, in Fig. 3 another three-electrode device with an example of an electric operating circuit, and in Fig. 4 a schematic cross section of a semi-conductor device.

The resistance device shown in Fig. 1 is composed of a crystalline semiconductor 1 and two metal electrodes 2, 3 which are intimately joined with the semiconductive body in surface contact therewith. Terminal leads 4 and 5 for the supply of current are attached to the respective electrodes. In principle, a device of this type may also operate as a rectifier if a barrier layer is formed between one of the electrodes and the semiconductor.

The three-electrode device of Fig. 2 is of the transistor type. It has a semiconductive body 6 in face-to-face contact with an electrode plate 7 and in point contact with two whisker electrodes 8 and 9.

The control device shown in Fig. 3 has a semi-conductor crystal 11 joined with three electrodes 12, 13 and 14. Electrodes 14 serves as a control electrode and is connected to one pole of an alternating current source 15. The other pole of source 15 is connected through a source 16 of direct-current bias voltage to the electrode 12, and is also connected through a power source 17 and a load resistor 18 to the electrode 13. Voltage variations of the alternating current source 15 are reproduced by amplified variations in voltage drop across load resistor 18. The load resistor 18 may directly form part of the device to be controlled, or its voltage may be applied to an amplifier or other intermediary device for energizing a device to be subjected to control.

For use as semiconductors in devices of the kind exemplified in the foregoing, the elements in the second sub-group of the fourth group of the periodic system (C, Si, Ge, Sn) have gained prominence, especially in rectifiers, crystal detectors, crystal amplifiers, photoelectric, thermo-electric and other circuit components. Carbon, which is a semiconductor only in its diamond modification, has so far been of merely scientific interest due to the high price of diamonds and the impossibility of producing them synthetically. Silicon has been useful in crystal detectors for electromagnetic waves, although the production of its crystals in pure condition still encounters extreme difficulties so that the theoretical upper limit of its electric resistance is far from attained. Germanium can be produced with a purity virtually up to the theoretical upper limit of its electric resistance. For that reason, germanium, in spite of its high cost, has largely superseded silicon for detectors and has afforded the possibility of producing controllable crystal devices for industrial applications. Tin, here of interest only in its gray, diamond-latticed modification, has so far been of scientific interest only, since gray tin is stable only at inconveniently low temperatures and cannot readily be produced in large crystals.

The four mentioned elements have the common characteristic of a diamond crystal lattice in which any atom is adjacent to four other atoms that occupy the corners of a regular tetrahedron with the first atom on its center. The atoms are linked together by a polarized, saturable valence force acting between immediately adjacent atoms. Each such bond is occupied by two electrons which, as such, do not contribute to the electric conductivity. Closely related to these linkage conditions is the extreme mobility, in such bodies, of electrons released photoelectrically or coming from points of disturbance, this mobility reaching values of 3,000 $cm.^2$/volt sec. in germanium. Another value of great significance for the semiconductive qualities of these substances is the size of the energy band forbidden for the electrons. The size of this band decreases progressively with the increasing atomic number of the elements. It amounts to 6 to 7 e. v. (electron volt) for diamond, 1.1 e. v. for silicon, 0.7 e. v. for germanium, and 0.1 e. v. for gray tin.

The various inherent difficulties of the four tetravalent substances, such as the infeasible synthetic production of diamond, the difficult production of pure crystals of silicon, the high cost of germanium and the instability of the diamond lattice of gray tin, give rise to the problem of finding other substances which also possess the important characteristic of a saturated homopolar linkage of one center atom to the four next neighbor atoms but avoid or minimize the mentioned difficulties. It is further desired to find a possibility of varying the width of the electron-forbidden band in a more continuous manner than offered by the series C, Si, Ge, Sn.

The above-mentioned copending application offers a solution of these problems which consists in using, for the purposes here in point, a semiconductor consisting essentially of a binary compound of the type $A_{III}B_{V}$, wherein $A_{III}$ is an element of the second subgroup in the third group of the periodic system of elements (B, Al, Ga, In, Tl), and $B_{V}$ is an element of the second subgroup in the fifth group of the peroidic system (N, P, As, Sb, Bi).

In principle, semiconductors of this type reduce or avoid the above-mentioned difficulties. The crystal lattices of the $A_{III}B_{V}$ compounds differ from those of the corresponding elements of the fourth group in that the lattice points are occupied by the third-group elements as trivalent ions and by the fifth-group elements as pentavalent ions, while the remaining (3+5=) eight electrons form the linking bond between neighboring atoms, each bond being occupied by two electrons. The resulting slight ionic proportion of the $A_{III}B_{V}$ compounds is accompanied by remarkable physicochemical properties. Due to the quantum-mechanical resonance between the ionic portion and the homopolar portion, the melting point of the $A_{III}B_V$ compound is higher than that of the otherwise closely corresponding fourth-group element. The width of the forbidden band is also increased, this increase being proportionately larger than that of the melting point. Consequently, the $A_{III}B_V$-type compounds offer the technological advantage of having for a desired melting point a wider forbidden band than the corresponding fourth-group element. Thus, the compound AlSb, melting at 1050° C. has a forbidden band wider than that of germanium, melting at 960° C. Hence, AlSb, as regards its theoretical upper limit of electrical resistance, approaches pure silicon (melting at 1450° C.), while having over silicon the advantage of a relatively low melting point better suitable for technological fabricating methods.

Among the various substances of the type $A_{III}B_V$, the aluminum compounds are especially favorable from economical viewpoints because these compounds can be made from abundantly available, cheap raw materials by simple and well-known methods. The crystalline bodies of such aluminum compounds when used as semiconductors, however, have been found to show imperfections in stability resulting in an undesirably limited useful life and insufficient constancy of the electric characteristics.

I have found that the just-mentioned deficiencies of the aluminum-compound semiconductors is eliminated, without foregoing their economic advantage by any requirement for costly auxiliaries, if these semiconductors are coated with aluminum oxide ($Al_2O_3$) on all surfaces other than the areas or points contacted by the pertaining electrodes.

According to the invention, therefore, the semi-conductor bodies 1, 6 and 11 in the illustrated or similar-type devices consist essentially of an alumina-coated body of a compound of aluminum with an element of the second subgroup in the fifth group of the periodic system, as is apparent from Fig. 4 where the alumina coating on the semiconductor body 1 of the device according to Fig. 1 is schematically shown at 20 with a thickness exaggerated for illustration. I have found that the coating need be given only the slight thickness sufficient for protection from humidity or chemical effects of the ambient air.

Especially suitable for the purpose of the invention are semiconductor bodies of aluminum antimonide and aluminum arsenide. These compounds are essentially alloys and may be produced by the conventional methods of making such alloys, for instance, by melting aluminum together with the alloying component in vacuum or in an inert gas and then casting the alloy or drawing a monocrystal from the melt. The solidified crystalline bodies are then coated with aluminum oxide ($Al_2O_3$).

The coating is preferably produced by heating the semiconductive body of a luminum compound in an oxygen-containing atmosphere such as substantially pure oxygen ($O_2$). The necessary heating can be effected by producing in, or passing through, the semiconductor, an electric current of sufficient magnitude.

As mentioned, the aluminum oxide coating is to occupy all surface areas not covered by contact with the electrodes. While it is possible to first oxidize all surfaces of the semiconductor and then remove the coating by grinding at those places where the electrodes are to be attached, a preferable and simpler method is to join the electrodes with the uncoated semiconductor bodies so that the device is essentially completed with the exception of the coating, and thereafter subjecting the device to the just-mentioned oxidizing treatment. The electric heating current may then be supplied to the semiconductive body by means of the electrodes of the device.

The aluminum compounds to be used as semiconductors for the purposes of the invention have a crystal lattice in which the four closest neighbors of any atom under consideration are located on the corners of a tetrahedron. In these compounds, the eight electrons available for the valence bond (three electrons supplied by the element $A_{III}$ and five electrons supplied by the element $B_V$) are distributed in pairs over the four homopolar links between each center atom and its four next neighbors on the corners of the tetrahedron so that all bonds are saturated. This explains the pronounced semiconductive character.

An alumina-coated semiconductor body of aluminum antimonide is well suitable as a substitute for germanium. This aluminum compound, in its pure monocrystalline condition, has an intrinsic conductance smaller than that of germanium. It is also superior to germanium in economical respects especially since, by virtue of the aluminum oxide coating, the constancy of the semiconductive properties and the length of useful life are just as satisfactory.

As is generally the case, the semiconductive properties of aluminum compounds are greatly affected by departures of their composition from the exact stoichiometric conditions. Consequently, only raw materials of highest purities are to be employed. However, as is well known, very small traces of substitutional impurities may be present or may intentionally be added to the compounds. These traces are usually too small to be expressed in percentage values but are in measurable evidence by their effect upon the semiconductive character. The aluminum compounds can be given a defect-electron conductance, also called hole conductance (p-conductance), by "doping" them with an acceptor impurity, for instance an element from the second group of the periodic system such as cadmium, zinc or magnesium. The aluminum compounds show excess electron conductance, also simply called electron conductance (n-conductance), when "doped" with donor impurities, for instance, from the sixth group of the periodic system such as tellurium or selenium.

In this and other respects the coated semiconductive aluminum compounds may be processed in the manner well known for the corresponding semiconductor devices with germanium or silicon as the semiconductive substance. The method of composing the semiconductor of different zones showing alternately different types of conductance, such as p-n junctions, n-p-n or p-n-p junctions, are likewise applicable. Since such junctions and corresponding fabricating methods are known as such and not essential to the invention proper they are not further described in this specification, the purpose of mentioning them being mainly to indicate that in these various respects the semiconductor devices according to the present invention are basically just as favorable and susceptible to modification as the known germanium and silicon semiconductors. However, if desired, reference may be had to the above-mentioned copending application for further information on applicable modifications and methods.

I claim:

1. A semiconductor device, comprising a semiconductive body consisting essentially of a binary compound of aluminum with an element of the second subgroup in the fifth group of the periodic system of elements, conductor electrodes joined with said body, and an aluminum oxide coating on the surface areas of said body other than those joined with said electrodes.

2. A semiconductor device, comprising a semiconductive body consisting essentially of crystalline aluminum antimonide, conductor electrodes joined with said body, and an oxide coating on the surface areas of said body other than those joined with said electrodes.

3. The method of producing a semiconductor device having a semiconductor body and conductor electrodes joined with said body, which comprises forming said semiconductor body of a binary compound of aluminum with an element of the second subgroup in the fifth group of the periodic system of elements, and heating the body in an oxygen-containing atmosphere to produce an aluminum oxide coating on the exposed surfaces of the body.

4. The method of producing a semiconductor device having a semiconductor body and conductor electrodes joined with said body, which comprises forming said semiconductor body of a binary compound of aluminum with an element of the second subgroup in the fifth group of the periodic system of elements, placing the body into an oxygen atmosphere, and passing an electric heating current through the body to produce an aluminum oxide coating on the exposed surfaces of the body.

5. The method of producing a semiconductor device having a semiconductor body and conductor electrodes joined with said body, which comprises forming said semiconductor body of a binary compound of aluminum with an element of the second subgroup in the fifth group of the periodic system of elements, assembling the electrodes with the body, placing the assembly into an oxygen atmosphere, and applying through the electrodes an electric heating current to the body to produce an aluminum oxide coating on the exposed surfaces of the body.

References Cited in the file of this patent

UNITED STATES PATENTS 1,748,012 Dooley ---------------- Feb. 18, 1930

OTHER REFERENCES

Welker: Z. Naturjorsch 7*a*, 744–9 (1952), CA–47–4158 F.

Hedges: Protective Films on Metals, 2nd ed. (1937), p. 57.